United States Patent [19]

Weber

[11] Patent Number: 5,468,045

[45] Date of Patent: Nov. 21, 1995

[54] ENERGY ABSORBING CHILD SEAT

[75] Inventor: James L. Weber, West Bloomfield, Mich.

[73] Assignee: Hoover Universal, Inc., Plymouth, Mich.

[21] Appl. No.: 282,397

[22] Filed: Jul. 28, 1994

[51] Int. Cl.⁶ .............................. B60N 2/42; B60R 21/00
[52] U.S. Cl. .................... 297/216.11; 297/216.13; 297/238; 297/471
[58] Field of Search .......................... 297/216.11, 216.1, 297/216.13, 216.14, 471, 325, 238; 296/68.1

[56] References Cited

U.S. PATENT DOCUMENTS

| | | | |
|---|---|---|---|
| 3,112,955 | 12/1963 | Stolz | 297/325 |
| 3,838,870 | 10/1974 | Hug | 297/384 X |
| 3,953,068 | 4/1976 | Porsche et al. | |
| 4,215,900 | 8/1980 | Coult. | |
| 4,480,870 | 11/1984 | Wimmersperg. | |
| 4,784,352 | 11/1988 | Smith et al. | 297/216 X |

FOREIGN PATENT DOCUMENTS 2606234  8/1977  Germany .......................... 297/216.11

Primary Examiner—Kenneth J. Dorner
Assistant Examiner—Anthony Barfield
Attorney, Agent, or Firm—Harness, Dickey & Pierce, P.L.C.

[57] ABSTRACT

An integral child seat having a back panel which is attached to the seat frame with an extensible, energy absorbing diaphragm. The diaphragm enables the child seat back panel to move forward relative to the seat frame during a vehicle collision to reduce the relative deceleration of a seat occupant's head compared to his/her shoulders, thus reducing the neck loads and neck injuries. As the diaphragm is extended, an enclosed space, defined in part by the diaphragm, increases in size. One or more small orifices are provided to allow a controlled flow of air into this enlarging space. Likewise, after extension, return of the diaphragm to its initial position is controlled by the required expulsion of air from this enlarged space. The orifices restrict the discharge of air from the enlarged space, avoiding a return impact on the seat occupant due to the rebound of the elastic diaphragm.

26 Claims, 3 Drawing Sheets

ENERGY ABSORBING CHILD SEAT

BACKGROUND AND SUMMARY OF THE INVENTION

The present invention relates generally to a motor vehicle seat with an integral child seat and in particular to an energy absorbing child seat.

Special child seats that provide protection for small children in motor vehicles are well known. Two different types of child seats have been developed. One type is a separate seat which is placed upon a vehicle seat and attached thereto by the seat belt provided as part of the vehicle seat. A second type of child seat, commonly referred to as an "integral child seat", has the components of the child seat built into the vehicle seat. Integral child seats typically include one or more movable components which, in one position, enable use of the vehicle seat by an adult, and in a second position, enable use of the vehicle seat by a small child. Common elements of both types of child seats are a lower seat support, a back support and a restraint system for the seat occupant. The restraint system generally includes one or two shoulder belts which are operatively connected between the back support and the seat support to restrain a passenger positioned on the seat support and the back support.

Any vehicle passenger, a child or an adult, can sustain neck injuries when restrained in a seat by a shoulder belt. When the vehicle is involved in a front impact collision, the passengers torso is restrained against the seat back by the shoulder belt while the passenger's head is free to move forward, bending the neck and possibly over extending the neck muscles. In small children, the ratio of the head mass to the body mass is higher than for an adult. As a result, children are somewhat more likely to receive neck injuries in a given vehicle collision. The present invention seeks to reduce neck injuries by providing a flexible mounting of the back panel of the child seat back to the seat structure or frame. The flexible mounting absorbs energy and allows the back panel to move forward relative to the seat frame. The result is a reduced relative velocity and deceleration between the child's head and shoulders, thereby reducing neck loads and injuries.

The present invention employs an air diaphragm to mount the back panel to the seat frame. The diaphragm acts as a shock absorber and extends forward during a frontal vehicle collision allowing the back panel to move forward from the seat frame a limited distance, reducing the deceleration of the seat occupant's head relative to the shoulders. Frangible fasteners are used to mount the back panel to the seat frame and hold the back panel in place during normal seat use. These fasteners hold the back panel substantially rigidly to the seat structure during normal use but are designed to fail at a force below which serious injuries occur, allowing the back panel to move forward under the control of the diaphragm. A tether is attached to the back panel and seat frame to limit the total forward deflection of the back panel.

As the diaphragm extends forward, an enclosed space is formed which increases in size as the diaphragm extends. The rear mounting plate of the diaphragm includes one or more small orifices to limit the flow of air into the enclosed space. The restricted air flow into the space and the elasticity of the diaphragm work together to reduce the deceleration on the seat occupant. Before the diaphragm can return to its unextended position, the air in the enclosed space must first exit through the orifice or orifices. This cushions the return of the back panel and reduces rearward impact on rebound.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
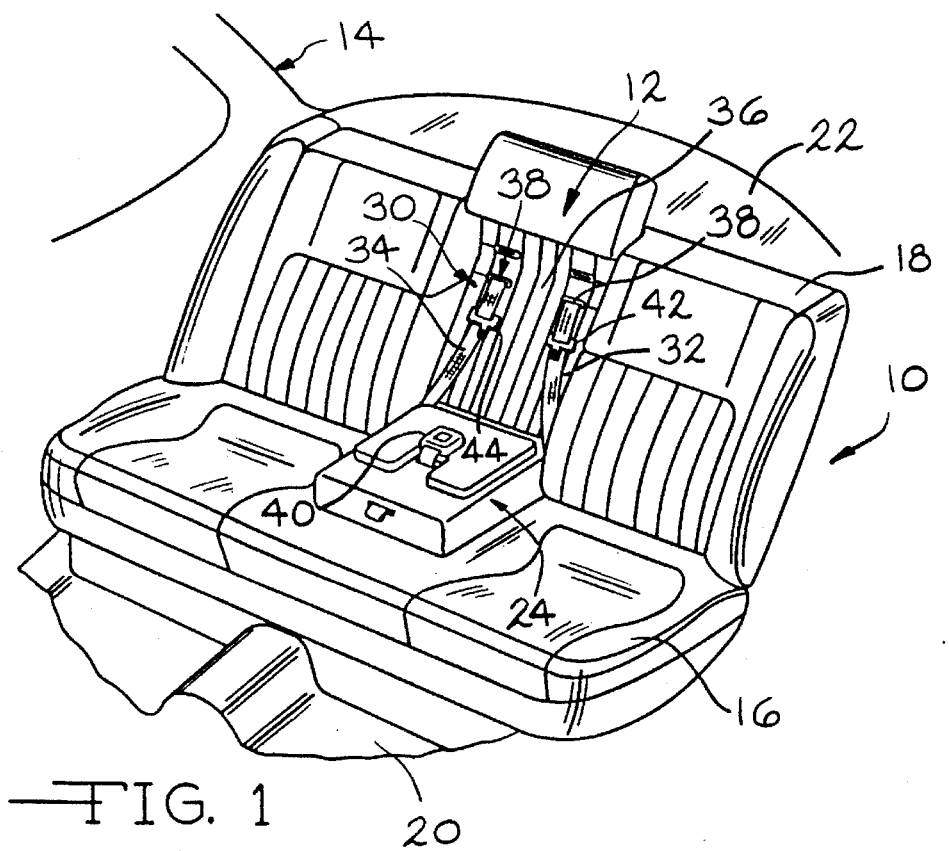
FIG. 1 is a perspective view of a vehicle seat assembly containing an energy absorbing integral child seat of the present invention.

A passenger car seat assembly 10 incorporating an energy absorbing integral child seat 12 of the present invention is shown in FIG. 1. The seat assembly 10 is of a conventional bench seat design used as a rear seat in a passenger car. The seat assembly 10 includes a lower seat cushion 16 and a seat back 18 extending upwardly at the rear of the lower seat cushion. The passenger car 14 in which the seat assembly is installed includes a vehicle body having a floor pan 20 and a rear shelf 22 extending rearwardly at the upper end of the seat back 18. The child seat 12 is shown in FIG. 1 in a deployed use position and includes a rotatable seat support 24. When the child seat is deployed, the seat support 24 forms a child seat cushion extending forwardly from the seat back in a generally horizontal position.

The child seat 12 includes a child restraint system 30 comprised of left and right belts 32, 34. The lower ends of the belts are attached to the left and right sides, respectively, of the seat support 24. From there, the belts extend upwardly overlying the child seat back support 36 until the belts reach one of the slots 38 in the child seat back support and pass through the back support. The restraint system 30 further includes a buckle 40 attached to the seat support 24 at a location between the legs of a child seat occupant. The clasps 42, 44 are slideably carried by the left and right belts, respectively, and are insertable into the buckle forming lap belts over the legs of a seat occupant and shoulder belts extending from the buckle 40 up and over the left and right shoulders of the seat occupant.

Figure 2:
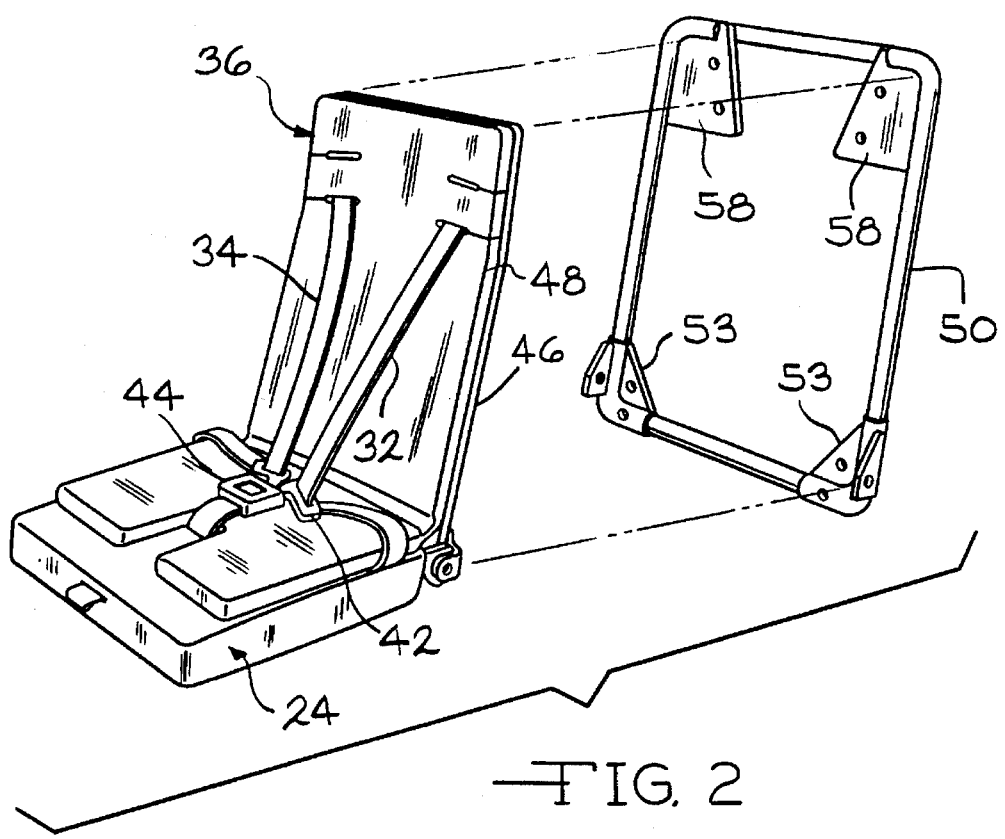
FIG. 2 is a perspective view showing the child seat and the seat back frame to which the child seat is attached.

With reference to FIG. 2, the child seat back support 36 is comprised of a back panel 46 and a foam pad 48 overlying the panel 46. The back panel 46 is mounted to a frame 50 of the seat assembly 10 which is attached to the vehicle body. In the illustrated embodiment, the frame 50 is attached to the vehicle floor pan 20 and rear shelf 22. The seat support 24 is mounted to frame 50, as well.

Figure 3:
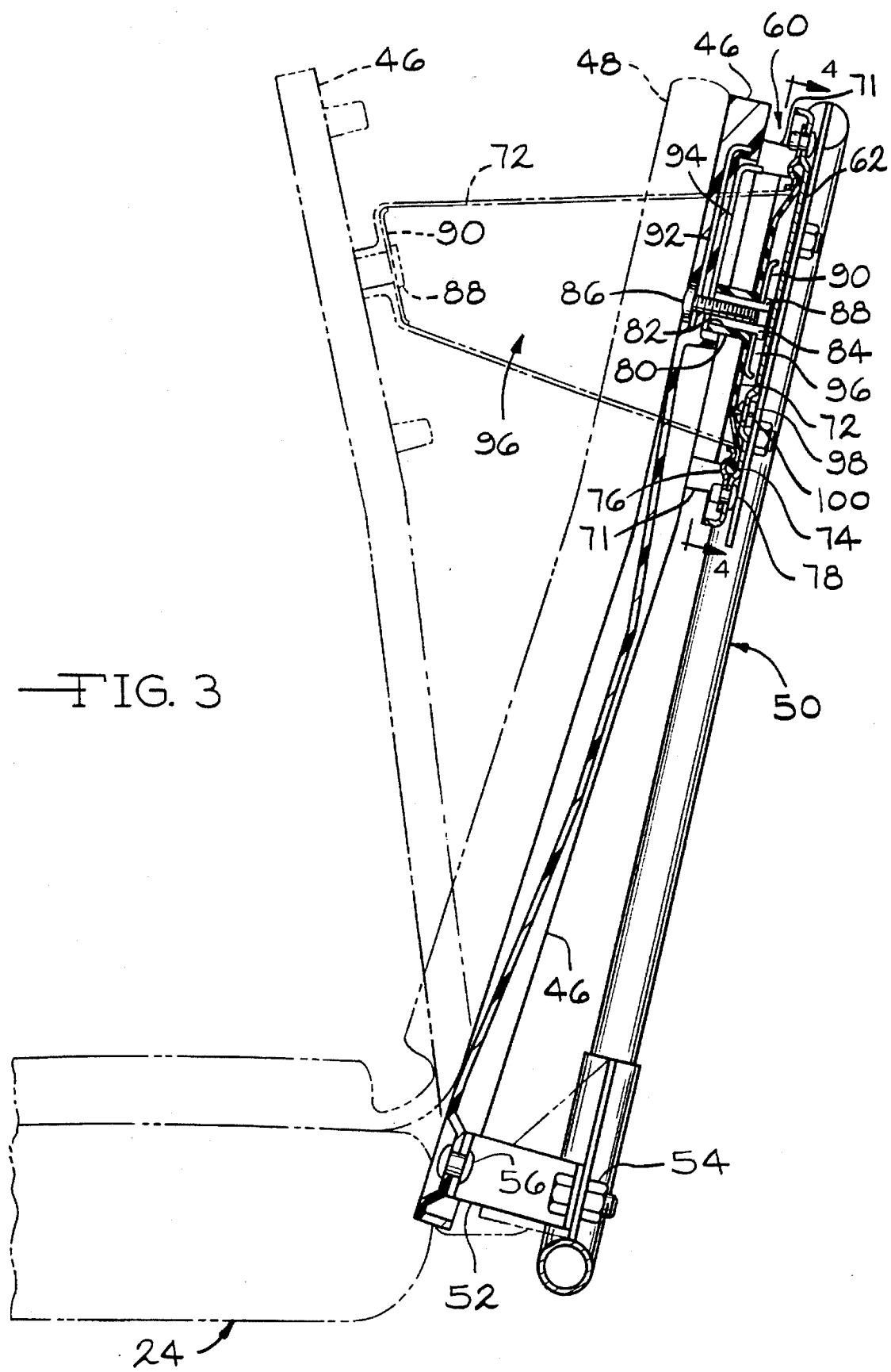
FIG. 3 is a fragmentary sectional view showing the flexible diaphragm attaching the child seat back panel to a seat frame.
Figure 4:
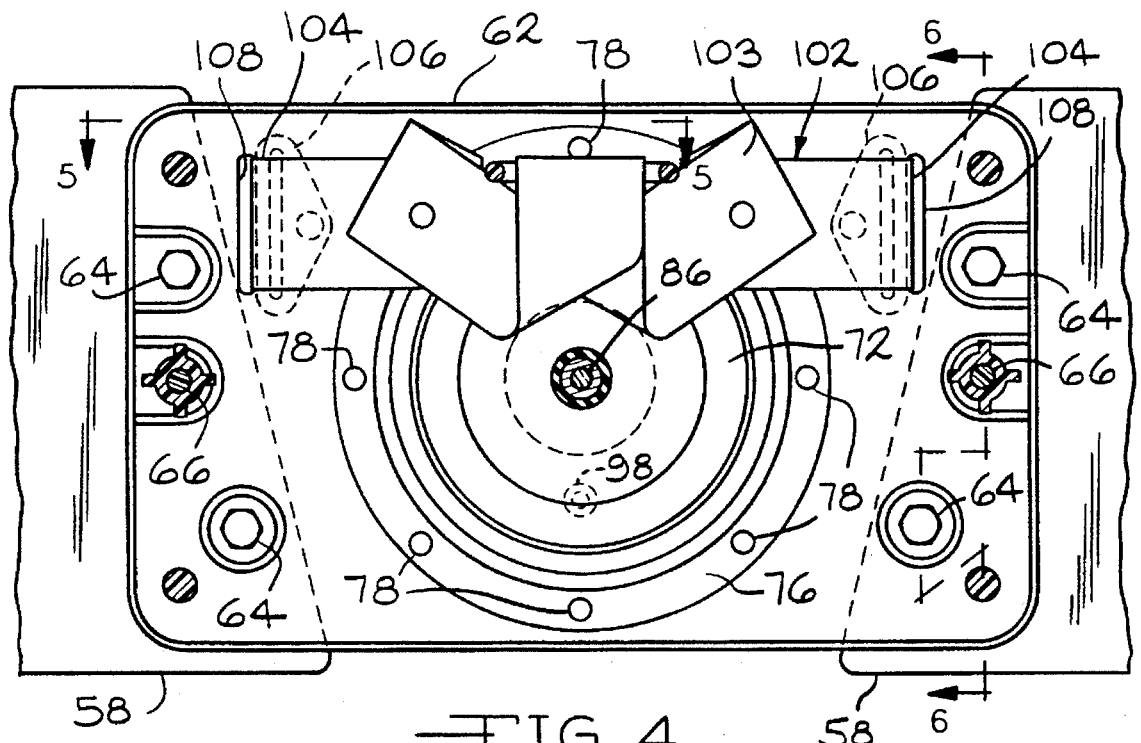
FIG. 4 is a front elevational view of the diaphragm mounting plate and tether for limiting forward travel of the back panel.
Figure 5:
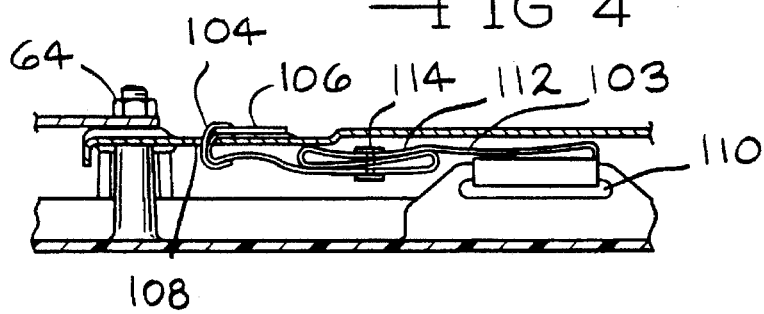
FIG. 5 is a sectional view as seen from substantial the line 5—5 of FIG. 4.
Figure 6:
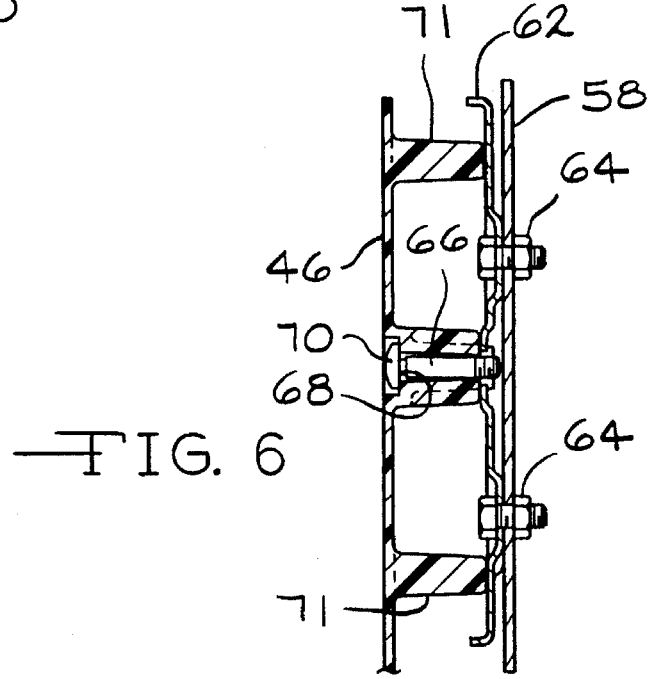
FIG. 6 is a sectional view as seen from substantial the line 6—6 of FIG. 4.

With reference to FIG. 3, the back panel 46 is shown attached to the frame 50 at its lower end through brackets 52 (only one of which is shown) with one bracket at each lower corner of the back panel 46. The brackets 52 are bolted to the mounting flanges 53 of the frame 50 by nut and bolt assemblies 54. The back panel 46 in turn is attached to the brackets 52 by rivets 56.

The frame 50 includes a pair of plates 58 at the upper end, to which the upper end of the back panel 48 is attached. The back panel 46 is attached to the plates 58 of frame 50 through a diaphragm assembly 60 described in detail below. The diaphragm assembly 60 includes a backing plate 62 which is bolted to the frame 50 by nut and bolt assemblies 64. The back panel 46 is directly attached to the backing plate 62 by a pair of frangible bolts 66. The bolts 66 hold the back panel stationary to the frame during normal use of the child seat, but are designed to break away at a predetermined load, allowing the back panel to separate from the backing plate 62 and move forward of the frame 50. The breakaway feature is provided in the bolts 66 by reduced diameter portions 68 in the bolts immediately beneath the bolt heads 70. Rearward extending posts 71 on the back panel 46 contact the backing plate 62 to position the back panel spaced forward from the backing plate and the frame 50.

The back panel 46 is also attached to the backing plate 62 by an extensible diaphragm 72. The diaphragm 72 is made of rubber or an elastic polymer and is generally circular in shape with an enlarged bead 74 at its circular periphery. A mounting ring 76 overlies the enlarged bead 74 and is secured by rivets or other similar fasteners 78 to the backing plate 62 about the periphery of the diaphragm. The diaphragm is generally planar and has a center mounting region in the form of a cylinder 80 extending generally normal to the plane of the diaphragm. The cylinder 80 has a central aperture 82. A threaded cylindrical bushing 74 is placed within the aperture 82 and has a shoulder 88 which secures an enlarged disc 90 to the rear side of the diaphragm 72. A bolt 86 extends rearward through the back panel 46 and is threaded through the bushing, thus attaching the center of the diaphragm to the back panel 46.

The back panel can be made of a variety of materials, including, but not limited to, molded thermal plastic resins and stamped sheet metal. In the illustrated embodiment, the back panel is made of a molded resin and is insert molded with two reinforcement plates 92,94. The bolt 86 which attaches the diaphragm to the back panel passes through the two reinforcements 92, 94 to ensure the connection between the diaphragm and the back panel.

During a vehicle collision, particularly a frontal vehicle collision, the forward restraint load in the belts 32, 34 is transferred to the back panel 46 and from the back panel to the frame 50. When the predetermined breaking point of the frangible bolts 66 is reached, these bolts will break, leaving the back panel secured to the frame at the upper end only by the diaphragm 72. The diaphragm 72 will stretch, allowing the back panel 46 to move forward from the frame 50 by bending of the back panel and/or bending of the brackets 52 attaching the lower end of the back panel to the frame 50.

As the diaphragm extends, the enclosed space 96, formed between the diaphragm and the backing plate, will increase in volume. A fitting 98 in the backing plate includes a small orifice 100 forming an air passage to allow air to be drawn into the increasing volume of the enclosed space 96. The size of the orifice 100 and the material properties of the diaphragm 72 are selected to provide the desired control to the forward deflection of the back panel 46. The disc 90 ensures that the forward end of the enclosed space 96 maintains a given size, i.e. the diameter of the disc. The periphery of the disc is curved rearward to avoid contact of the possibly sharp disc edge with the diaphragm.

Following the initial forward travel of the back panel, the elastic properties of the diaphragm will draw the back panel rearward, back to the frame 50. In order for the diaphragm to return, the air, now within the enclosed space 96, must be expelled through the orifice 100. The small size of the orifice prevents the rapid return of the back panel, thereby avoiding high rebound forces on the seat occupant. Any number of fittings can be placed in the backing plate to provide the desired air flow into and out of the enclosed space 96. Furthermore, if the desired air flow rate into the space 96 differs from the desired air flow rate out of the space 96, one or more fittings having a one way check valve can be employed, so that air only flows in one direction through those valves. This produces different flow rates into and out of the enclosed space to provide a flow rate difference.

A tether 102 is provided to limit the maximum forward travel of the back panel from the frame. Tether 102 is preferably a short length of seat belt webbing 103 which is attached at each end 104 to the backing plate 62 by belt anchors 106. The anchors 106 are positioned behind the backing plate with the webbing 103 passing through slots 108 in the backing plate. The webbing 103 passes through a loop 110 in the back panel 46 to limit forward travel of the back panel. The loop 110 is part of the reinforcement 94 in the back panel. In its stowed position, the webbing 103 is folded upon itself in two sections 112 on each side of the loop 110 in the back panel. The folded webbing sections are held together with light weight plastic ties 114. During extension of the diaphragm 72, the ties 114 easily break, allowing the tether webbing 103 to unfold.

The child seat back panel of the present invention is attached to the seat frame with an extensible, energy absorbing diaphragm. The diaphragm enables the child seat back panel to move forward relative to the seat frame during a vehicle collision to reduce the relative deceleration of a seat occupant's head compared to his/her shoulders, thus reducing the neck loads and neck injuries. As the diaphragm is extended, an enclosed space, defined in part by the diaphragm, increases in size. One or more small orifices are provided to allow a controlled flow of air into this enlarging space. Likewise, after extension, return of the diaphragm to its initial position is controlled by the required expulsion of air from this enlarged space. The orifices restrict the discharge of air from the enlarged space, avoiding a return impact on the seat occupant due to the rebound of the elastic diaphragm.

It is to be understood that the invention is not limited to the exact construction illustrated and described above, but that various changes and modifications may be made without departing from the spirit and scope of the invention as defined in the following claims.

I claim:

1. A seat assembly for a vehicle having a body, said seat assembly comprising:

a seat frame adapted to be attached to the vehicle body;

a child seat for a child occupant, said child seat including a back panel, a seat support adjacent to said back panel and a restraint system operatively connected between said back panel and said seat support to restrain a passenger positioned on said seat support and said back panel whereby at least a portion of the load applied to said restraint system by a seat occupant during a vehicle collision is transferred to said back panel; and coupling means for coupling said back panel to said frame, forward of said frame, and for permitting fore and aft movement of said back panel relative to said frame, said coupling means including an elastic diaphragm attached to said back panel and to said seat frame and which is drawn tightly therebetween whereby said diaphragm is stretched upon forward movement of said back panel to absorb energy.

2. The seat assembly of claim 1 further comprising means for rigidly securing said back panel to said frame to prevent said fore and aft movement of said back panel during forward loading on said back panel up to a predetermined maximum load on said back panel.

3. The seat assembly of claim 2 wherein said means for rigidly securing said back panel to said frame includes at least one frangible fastener configured to fracture when a forward load approximately equal to said predetermined maximum load is applied to said back panel.

4. The seat assembly of claim 1 further comprising means for limiting the extent of forward travel of said back panel from said seat frame.

5. The seat assembly of claim 4 wherein said means for limiting the extent of forward travel of said back panel from said seat frame includes an elongated tether strap attached to said seat frame and said back panel at spaced locations along the length of said tether strap, said tether strap being folded between said spaced locations and unfolding upon forward movement of said back panel from said seat frame.

6. The seat assembly of claim 5 wherein said tether strap has two spaced ends attached to said seat frame and wherein said back panel includes a slot forming a passage through which said tether strap extends between said two ends and in which said tether strap is confined whereby said tether strap can not be removed from said slot.

7. The seat assembly of claim 1 wherein said back panel has first and second ends and is flexible in bending between said two ends, and said coupling means is attached to said back panel adjacent said first end allowing said first end to move forward from said seat frame, and further comprising attaching means for rigidly attaching said back panel to said seat frame adjacent said second end whereby said back panel bends between said two ends as said first end is moved forward from said seat frame.

8. The seat assembly of claim 1 wherein said elastic diaphragm has an outer periphery coupled to said seat frame and a center mounting region coupled to said back panel.

9. The seat assembly of claim 1 wherein said said diaphragm is a part of a diaphragm assembly comprises a backing plate attached to said seat frame and said elastic diaphragm is attached to said backing plate and to said back panel.

10. The seat assembly of claim 9 wherein said elastic diaphragm has an outer periphery attached to said backing plate and a center mounting region coupled to said back panel.

11. The seat assembly of claim 9 wherein said diaphragm and said backing plate together define an enclosed space which increases in volume as said diaphragm stretches upon movement of said back panel and further comprising orifice means providing an air passage between said enclosed space and the surrounding atmosphere whereby air can flow into and out of said enclosed spaced upon stretching and return of said diaphragm.

12. The seat assembly of claim 11 wherein said orifice means includes means for varying the size of said air passage between said enclosed space and the surrounding atmosphere responsive to the direction of movement of said back panel.

13. The seat assembly of claim 11 wherein said orifice means provides multiple air passages between said enclosed space and the surrounding atmosphere.

14. The seat assembly of claim 13 further comprising check valve means in a portion of said multiple air passages whereby air flow through said portion of said multiple air passages is limited to air flow in a single direction.

15. A seat assembly for a vehicle having a body, said seat assembly comprising:

a seat frame adapted to be attached to the vehicle body;

a child seat for a child occupant, said child seat including a back panel, a seat support adjacent to said back panel and a restraint system operatively connected between said back panel and said seat support to restrain a passenger positioned on said seat support and said back panel whereby at least a portion of the load applied to said restraint system by a seat occupant during a vehicle collision is transferred to said back panel; and an elastic diaphragm attached to said back panel and said seat frame and which is drawn tightly therebetween to couple said back panel to said seat frame and to permit forward movement of said back panel relative to said frame upon stretching of said elastic diaphragm to absorb energy.

16. The seat assembly of claim 15 wherein said elastic diaphragm is substantially planar having an outer periphery attached to said frame and a center mounting region attached to said back panel.

17. The seat assembly of claim 16 further comprising means forming an enclosed space defined in part by said elastic diaphragm which increases in size upon stretching of said elastic diaphragm, and orifice means providing an air passage between said enclosed space and the surrounding atmosphere whereby air can flow into and out of said enclosed spaced upon stretching and return of said diaphragm.

18. The seat assembly of claim 17 wherein said orifice means provides multiple air passages between said enclosed space and the surrounding atmosphere.

19. The seat assembly of claim 18 further comprising check valve means in a portion of said multiple air passages whereby air flow through said portion of said multiple air passages is limited to air flow in a single direction.

20. A seat assembly for a vehicle having a body, said seat assembly comprising:

a seat frame adapted to be attached to the vehicle body;

a child seat for a child occupant, said child seat including a back panel with first and second ends, a seat support adjacent to said back panel and a restraint system operatively connected between said back panel and said seat support to restrain a passenger positioned on said seat support and said back panel whereby at least a portion of the load applied to said restraint system by a seat occupant during a vehicle collision is transferred to said back panel;

attaching means for rigidly attaching said back panel to said seat frame at said second end, said back panel and said attaching means permitting forward movement of said back panel first end relative to said frame; and coupling means for coupling said back panel to said frame adjacent said first end with said back panel being positioned forward of said frame, said coupling means including a diaphragm assembly having a backing plate attached to said seat frame, an elastic diaphragm attached to said backing plate and to said back panel and which is drawn tightly therebetween and which is extensible upon forward movement of said back panel first end to absorb energy.

21. The seat assembly of claim 20 wherein said elastic diaphragm is substantially planar having an outer periphery attached to said backing plate and a center mounting region attached to said back panel.

22. The seat assembly of claim 20 wherein said diaphragm and said backing plate together define an enclosed space which increases in volume as said diaphragm stretches upon movement of said back panel and further comprising orifice means providing an air passage between said enclosed space and the surrounding atmosphere whereby air can flow into and out of said enclosed spaced upon stretching and return of said diaphragm.

23. The seat assembly of claim 22 wherein said orifice means provides multiple air passages between said enclosed space and the surrounding atmosphere.

24. The seat assembly of claim 23 further comprising check valve means in a portion of said multiple air passages whereby air flow through said portion of said multiple air passages is limited to air flow in a single direction.

25. The seat assembly of claim 20 further comprising means for rigidly securing said back panel to said frame to prevent said fore and aft movement of said back panel first end during forward loading on said back panel up to a predetermined maximum load, said means for rigidly securing said back panel to said frame including at least one frangible fastener configured to fracture when a forward load approximately equal to said predetermined maximum load is applied to said back panel.

26. The seat assembly of claim 20 further comprising tether means operatively connected to said back panel and said seat frame for limiting the amount of forward travel of said back panel first end from said seat frame.

* * * * *